(12) United States Patent
Takegami

(10) Patent No.: US 11,165,361 B2
(45) Date of Patent: Nov. 2, 2021

(54) POWER SUPPLY AND MEDICAL SYSTEM

(71) Applicant: TDK CORPORATION, Tokyo (JP)

(72) Inventor: Eiji Takegami, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/810,215

(22) Filed: Mar. 5, 2020

(65) Prior Publication Data
US 2020/0295667 A1 Sep. 17, 2020

(30) Foreign Application Priority Data

Mar. 11, 2019 (JP) .............................. JP2019-043316

(51) Int. Cl.
*H02M 3/335* (2006.01)
*H02M 7/217* (2006.01)

(52) U.S. Cl.
CPC ... *H02M 3/33592* (2013.01); *H02M 3/33507* (2013.01); *H02M 3/33546* (2013.01); *H02M 7/217* (2013.01)

(58) Field of Classification Search
CPC ......... H02M 3/33592; H02M 3/33507; H02M 3/33546; H02M 7/217
See application file for complete search history.

(56) References Cited

U.S. PATENT DOCUMENTS

| 6,026,005 | A | 2/2000 | Abdoulin | |
| 9,401,658 | B2* | 7/2016 | Bao | H02M 7/19 |
| 9,490,717 | B2 | 11/2016 | Wang et al. | |
| 2018/0069485 | A1* | 3/2018 | Hsiao | H02M 3/285 |

FOREIGN PATENT DOCUMENTS

| JP | 11-69805 | 3/1999 |
| JP | 2009-44909 | 2/2009 |
| JP | 2016-63733 | 4/2016 |

* cited by examiner

*Primary Examiner* — Rafael O Leon De Domenech
(74) *Attorney, Agent, or Firm* — Greenblum & Bernstein, P.L.C.

(57) ABSTRACT

A power supply includes a synchronous rectification-type rectifying/smoothing circuit to increase the conversion efficiency of an output voltage, avoids cost increases, and can change the output voltage and maximum output current. The power supply includes synchronous rectifiers connected to secondary windings of a transformer, smoothing circuits that smooth a voltage outputted from the synchronous rectifiers to produce an output voltage, switch drivers that correspond to the synchronous rectifiers and operate on one or both of the output voltage outputted from the smoothing circuits connected to the synchronous rectifiers and an AC voltage generated in the secondary windings to drive synchronous rectification switches of the synchronous rectifiers, and an output connector that is disposed following the smoothing circuits and connects the outputs of the smoothing circuits in a connection pattern selected out of serial and parallel.

8 Claims, 6 Drawing Sheets

POWER SUPPLY AND MEDICAL SYSTEM

FIELD OF THE INVENTION

The present invention relates to a power supply configured so that the final output voltage can be changed by changing the connection pattern of a plurality of circuits on the secondary side of a transformer, and to a medical system equipped with such power supply.

DESCRIPTION OF THE RELATED ART

As one example of a power supply of this type, the power supply (variable power supply) disclosed in Patent Literature 1 (Japanese Laid-open Patent Publication No. 2009-44909) is known. This power supply includes a plurality of switching power supplies that each generate a DC voltage, switching means that are provided for each of the plurality of switching power supplies and each insert (that is, selectively connect in series) or disconnect the corresponding switching power supply onto or from a voltage supply path according to a switching signal, and a switching control means that receives information on a designated voltage and transmits a switching signal to each of the switching means so that an output voltage that matches the designated voltage is generated across both ends of the voltage supply path.

In this power supply, the switching control means receives the information on the designated voltage and sends a switching signal to each switching means. Each switching means inserts the corresponding switching power supply onto the voltage supply path or disconnects the switching power supply from the voltage supply path according to the switching signal. By doing so, an output voltage that matches the designated voltage can be generated across both ends of the voltage supply path.

SUMMARY OF THE INVENTION

An ordinary switching power supply is normally provided with a rectifying and smoothing circuit that is connected to the secondary winding of the transformer and converts an AC voltage generated in the secondary winding into a DC voltage. In addition, in most switching power supplies produced recently, a synchronous rectification-type rectifying and smoothing circuit is often used to reduce the losses at the rectifying and smoothing circuit, that is, to increase the conversion efficiency at the rectifying and smoothing circuit. In a synchronous rectification-type rectifying and smoothing circuit, a field-effect transistor (and in particular, a MOSFET) with a low on-resistance is used as the rectifier. A driving controller that generates a driving signal for the field-effect transistor based on the generation timing of an AC voltage in the secondary winding is provided so that the field effect transistor is turned on and off in synchronization with the generation timing of the AC voltage.

In addition, in a power supply with a synchronous rectification-type rectifying and smoothing circuit, to achieve the same functions as the power supply (variable power supply) described above as a background art that selectively connects a plurality of switching power supplies in series so that an output voltage that matches a designated voltage can be generated across both ends of a voltage supply path, it would be conceivable to use a configuration where a transformer is provided with a plurality of secondary windings, a synchronous rectification-type rectifying and smoothing circuit is connected to each secondary winding, the plurality of rectifying and smoothing circuits are selectively connected in series, and a field-effect transistor included in each rectifying and smoothing circuit is turned on and off by a driving signal generated by a shared driving controller.

However, in a configuration where the field effect transistor of each rectifying and smoothing circuit is turned on and off by a driving signal generated by a shared driving controller, when the rectifying and smoothing circuits are connected in series, it will be necessary to apply, to each gate electrode of a field effect transistor in a rectifying and smoothing circuit connected downstream in the series connection, a driving signal with a voltage that increases by the cumulative total of the output voltages outputted from the other rectifying and smoothing circuits. This makes it necessary to use costly field-effect transistors with sufficient durability for higher gate voltages, resulting in the problem of an increase in product cost.

In addition to the function described above of changing the output voltage, it is also preferable for a power supply to have a function of changing the maximum value of the output current.

The present invention was conceived in view of the problems described above and has a principal object of providing a power supply that includes a synchronous rectification-type rectifying and smoothing circuit but increases the efficiency of conversion to the output voltage, avoids an increase in product cost, and is provided with a function for changing the maximum value of the output current in addition to the function of changing the output voltage. Another principal object is to provide a medical system equipped with such power supply.

To achieve the stated object, a power supply according to the present invention comprises: a transformer including a primary winding and a plurality of secondary windings that are formed with a same number of turns; a primary-side switch that intermittently applies a direct current (DC) voltage to the primary winding; a plurality of synchronous rectifiers which are equal in number to the plurality of secondary windings, which have a same configuration including a synchronous rectification switch, which are respectively connected to the plurality of secondary windings, and which each perform synchronous rectification of an alternating current (AC) voltage generated in the corresponding secondary winding; a plurality of smoothing circuits which are equal in number to the secondary windings, which have a same configuration including a smoothing capacitor, which are respectively connected to the plurality of synchronous rectifiers, and which each smooth a voltage outputted by the corresponding synchronous rectifier and output as a DC voltage; a plurality of switch drivers that are provided to correspond one-to-one to the plurality of synchronous rectifiers, which operate on one or both of the DC voltage outputted from the smoothing circuit connected to the corresponding synchronous rectifier and the AC voltage generated in the corresponding secondary winding connected to the synchronous rectifier, and drive the synchronous rectification switches that construct the corresponding synchronous rectifier; and an output connector which is disposed following the plurality of smoothing circuits and which connects outputs of the plurality of smoothing circuits in a connection pattern selected out of parallel connection and serial connection, wherein the DC voltage outputted from the plurality of smoothing circuits is outputted having been converted to an output voltage corresponding to the selected connection pattern.

A power supply according to the present invention comprises: a transformer including a primary winding, a plurality of secondary windings that are formed with a same number of turns, and a plurality of auxiliary windings that are equal in number to the secondary windings, that one-to-one correspond to the secondary windings, and are formed with a same number of turns; a primary-side switch that intermittently applies a DC voltage to the primary winding; a plurality of synchronous rectifiers which are equal in number to the plurality of secondary windings, which have a same configuration including a synchronous rectification switch, which are respectively connected to the plurality of secondary windings, and which each perform synchronous rectification of an AC voltage generated in the corresponding secondary winding; a plurality of smoothing circuits which are equal in number to the secondary windings, which have a same configuration including a smoothing capacitor, which are respectively connected to the plurality of synchronous rectifiers, and which each smooth a voltage outputted by the corresponding synchronous rectifier and output as a DC voltage; a plurality of switch drivers that are provided to correspond one-to-one to the plurality of synchronous rectifiers, which operate on one or both of the DC voltage outputted from the smoothing circuit connected to the corresponding synchronous rectifier and the AC voltage generated in the corresponding secondary winding connected to the synchronous rectifier and also on a voltage generated in the auxiliary winding corresponding to the second winding, and which drive the synchronous rectification switches that construct the corresponding synchronous rectifier; and an output connector which is disposed following the plurality of smoothing circuits and which connects outputs of the plurality of smoothing circuits in a connection pattern selected out of parallel connection and serial connection, wherein the DC voltage outputted from the plurality of smoothing circuits is outputted having been converted to an output voltage corresponding to the selected connection pattern.

Accordingly, the power supplies described above include synchronous rectification-type rectifying and smoothing circuits composed of the synchronous rectifiers and the smoothing circuits and are capable of increasing the conversion efficiency of the output voltage and output current from these circuits, and in turn the output voltage and the output current from the output connector. In addition, by making it possible to use low-cost field effect transistors that have low durability for high gate voltages as the synchronous rectification switches, it is possible to avoid an increase in product cost. In addition to doing so, it is possible to change the output voltage from the power supply by selecting a pattern where the outputs of the smoothing circuits are connected in series in the output connector disposed following the smoothing circuits, and possible to change the maximum value of the output current from the power supply by selecting a pattern where the outputs of the smoothing circuits are connected in parallel in the output connector.

A medical system according to the present invention comprises: the power supply according to claim 1 that further includes a pair of input terminals connected to an input line, a rectifying and smoothing circuit that is connected via a pair of power supply lines to the pair of input terminals, rectifies and smoothes an AC input voltage inputted via the input line, the pair of input terminals, and the pair of power supply lines, and outputs to the primary-side switch, and a fuse or breaker interposed on the pair of power supply lines; and a medical appliance that is connected downstream of the power supply and operates based on the output voltage from the power supply.

Accordingly, with the medical system described above, since the power supply described above is equipped with a transformer with reinforced insulation as described above and also has a fuse or breaker on the pair of power supply lines, it is possible for the power supply on its own to meet medical standards. This means that it is possible to achieve a configuration that meets medical standards without interposing an isolation transformer or a fuse (or breaker) outside the power supply (in more detail, on the input line connected to the power supply). Also, according to this medical system, by including the power supply described above, it is possible to achieve the same effects as the power supply alone described above.

A medical system according to the present invention comprises: the power supply according to claim 1 that further includes a pair of input terminals connected to an input line and a rectifying and smoothing circuit that is connected to the pair of input terminals and rectifies and smoothes an AC input voltage inputted via the input line and the pair of input terminals and outputs to the primary-side switch; a fuse or breaker interposed on the input line; and a medical appliance that is connected downstream of the power supply and operates based on the output voltage from the power supply.

According to the medical system where the power supply includes the transformer that has reinforced insulation, it is possible to realize a configuration capable of meeting medical standards by merely providing the fuse (or breaker) outside the power supply (in more detail, on the input lines connected to the power supply). Also, according to the medical system, by including the power supply described above, it is possible to achieve the same effects as the power supply alone described above.

A medical system according to the present invention comprises: one of the power supplies described above that further includes a pair of input terminals connected to an input line, a rectifying and smoothing circuit that is connected via a pair of power supply lines to the pair of input terminals, rectifies and smoothes an AC input voltage inputted via the input line, the pair of input terminals, and the pair of power supply lines, and outputs to a primary-side switch, and a first fuse or first breaker interposed on one power supply line out of the pair of power supply lines; a second fuse or second breaker interposed on the input line connected via the input terminal to another power supply line out of the pair of power supply lines; and a medical appliance that is connected downstream of the power supply and operates based on the output voltage from the power supply.

According to the medical system where the power supply includes the transformer that has reinforced insulation, since the power supply further internally includes the first fuse or the first breaker interposed on one power supply line, by merely interposing the second fuse or the second breaker outside the power supply (in more detail, on the input line connected to the other power supply line out of the input lines connected to the power supply), it is possible to realize a configuration capable of meeting medical standards. Also, according to the medical system, by including the power supply described above, it is possible to achieve the same effects as the power supply alone described above.

That is, the power supply according to the present invention includes a synchronous rectification-type rectifying and smoothing circuit and is capable of increasing the conversion efficiency of the output voltage and capable of changing the output voltage and the maximum value of the output current while avoiding an increase in product cost. Also, a medical system according to the present invention includes the power supply described above and is capable of achieving the same effects as the power supply alone and of realizing a configuration that meets medical standards.

It should be noted that the disclosure of the present invention relates to the contents of Japanese Patent Application No. 2019-043316 that was filed on Mar. 11, 2019, the entire contents of which are herein incorporated by reference.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

Figure 1:
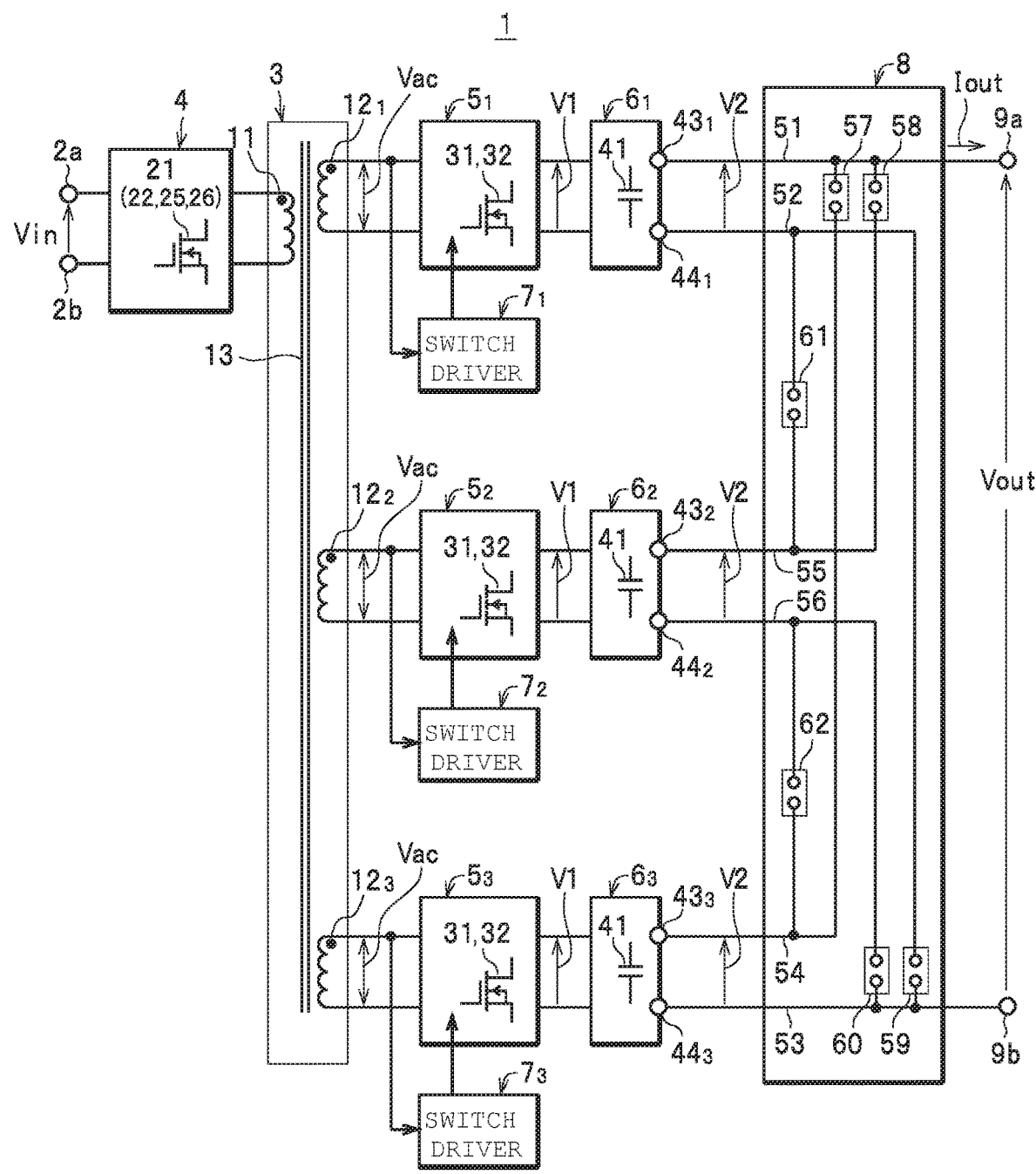
FIG. 1 is a diagram depicting the configuration of a power supply.

Preferred embodiments of a power supply and a medical system will now be described with reference to the accompanying drawings.

First, the configuration of a power supply 1 as an example of a power supply according to the present invention will be described with reference to FIG. 1. As one example, the power supply 1 includes a pair of input terminals $2a$ and $2b$ (hereinafter referred to as the "input terminals 2" when no particular distinction is made between them), a transformer 3, a primary-side switch 4, a plurality of synchronous rectifiers 5 (as one example in FIG. 1, three synchronous rectifiers $5_1$, $5_2$, and $5_3$ corresponding to the number (three) of secondary windings 12 formed as described later in the transformer 3, hereinafter collectively referred to as the "synchronous rectifiers 5" when no particular distinction is made between them), a number of smoothing circuits $6_1$, $6_2$, and $6_3$ that is equal to the number of synchronous rectifiers 5 (hereinafter collectively referred to as the "smoothing circuits 6" when no particular distinction is made between them), switch drivers $7_1$, $7_2$ and $7_3$ respectively provided corresponding to the synchronous rectifiers $5_1$, $5_2$, and $5_3$ (hereinafter referred to as the "switch drivers 7" when no particular distinction is made between them), an output connector 8, and a pair of output terminals $9a$ and $9b$ (hereinafter referred to as the "output terminals 9" when no particular distinction is made between them). The power supply 1 generates a direct current (hereinafter "DC") output voltage Vout as an output voltage based on a DC input voltage Vin inputted across the input terminals $2a$ and $2b$ (that is, a DC voltage where the potential at the input terminal $2a$ is high relative to the potential at the input terminal $2b$), and outputs the DC output voltage Vout across the output terminals $9a$ and $9b$ (that is, outputs in a state where the potential at the output terminal $9a$ is high relative to the potential at the output terminal $9b$).

The transformer 3 includes a primary winding 11, a secondary winding 12, and a shared magnetic core 13 that magnetically couples the primary winding 11 and the secondary winding 12. As one example in the present embodiment, the transformer 3 is configured as a single transformer including a single magnetic core 13, a single primary winding 11 that is wound around the magnetic core 13, and a plurality of secondary windings 12 (as one example in the present embodiment, three secondary windings $12_1$, $12_2$, and $12_3$, hereinafter collectively referred to as the "secondary windings 12" when no particular distinction is made between them) that are wound around the magnetic core 13. Here, each secondary winding 12 is formed with the same specification (that is, using the same wire material and with the same number of turns).

The primary-side switch 4 is configured to include a main switch 21 and is disposed between the input terminals 2 and the primary winding 11 of the transformer 3 so that the DC input voltage Vin is intermittently applied to the primary winding 11 as a DC voltage by a switching operation by the main switch 21. Although the main switch 21 is constructed here of an n-channel MOSFET as one example, the present invention is not limited to this and various semiconductor switches, such as bipolar transistors, can be used.

The synchronous rectifiers $5_1$, $5_2$, and $5_3$ each have the same configuration that includes two synchronous rectification switches 31 and 32. The synchronous rectifiers $5_1$, $5_2$, and $5_3$ are connected to the corresponding secondary windings $12_1$, $12_2$, and $12_3$, perform synchronous rectification of an AC voltage Vac with the same amplitude generated in the corresponding secondary windings $12_1$, $12_2$, and $12_3$, and each output a voltage V1 of the same voltage value.

The smoothing circuits $6_1$, $6_2$, and $6_3$ each have the same configuration that includes a smoothing capacitor 41, are connected to the corresponding synchronous rectifiers $5_1$, $5_2$, and $5_3$, smooth the voltage V1 outputted from the corresponding synchronous rectifiers $5_1$, $5_2$, and $5_3$, and output the result as a DC voltage (output voltage) V2 of the same voltage value.

The switch drivers $7_1$, $7_2$, and $7_3$ are provided for the corresponding synchronous rectifiers $5_1$, $5_2$, and $5_3$, operate on only one or both of the DC voltage V2 outputted from a corresponding smoothing circuit $6_1$, $6_2$, or $6_3$ connected to the synchronous rectifier $5_1$, $5_2$, or $5_3$ where that switch driver 7 is provided and the AC voltage Vac generated in the corresponding secondary winding $12_1$, $12_2$, or $12_3$ connected to that synchronous rectifier $5_1$, $5_2$ or $5_3$, and each drive the synchronous rectification switches 31 and 32 that construct the corresponding synchronous rectifier $5_1$, $5_2$, or $5_3$.

The circuit configurations described below may be used for the primary-side switch 4 and the transformer 3 described above. The synchronous rectifier 5 connected to each secondary winding 12 described above, the smoothing circuit 6 connected to each synchronous rectifier 5, and the switch drivers 7 may use the circuit configuration described below in accordance with the respective circuit configurations of the primary-side switch 4 and the transformer 3. The transformer 3, the primary-side switch 4, the synchronous rectifiers 5, the smoothing circuits 6, and the switch drivers 7 will now be described in detail. Note that since the synchronous rectifier 5 connected to each secondary winding 12, the smoothing circuit 6 connected to each synchronous rectifier 5, and each switch driver 7 have the same configurations for each circuit configuration of the primary-side switch 4 and the transformer 3, a secondary winding $12_1$, a synchronous rectifier $5_1$ connected to the secondary winding $12_1$, the smoothing circuit 61 connected to the synchronous rectifier $5_1$, and the switch driver $7_1$ that drives the synchronous rectifier $5_1$ will be described as representative examples.

Figure 2:
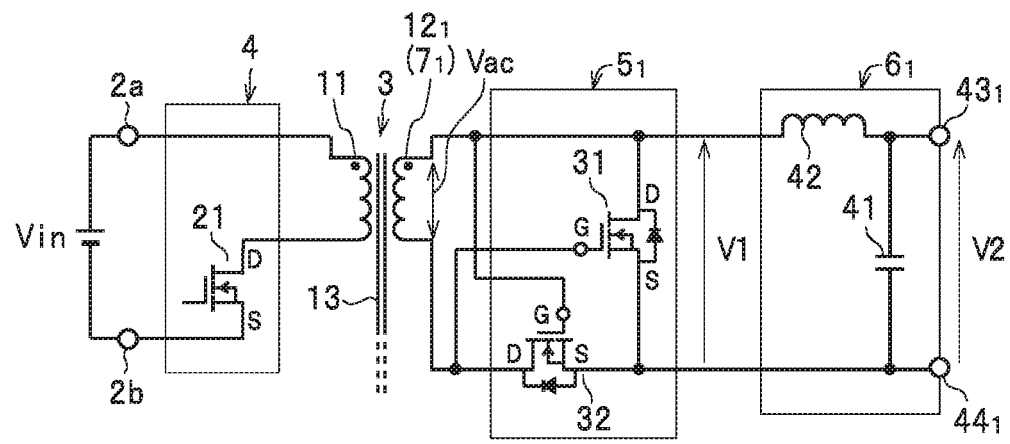
FIG. 2 is a diagram depicting the configurations of a secondary winding, a synchronous rectifier, and a smoothing circuit for a case where a single-ended forward configuration is used for a primary-side switch and a transformer.

First, the respective configurations of the secondary winding $12_1$, the synchronous rectifier $5_1$, and the smoothing circuit 61 will be described for a case where the circuit configuration (a single-ended forward configuration) depicted in FIG. 2 is used for the primary-side switch 4 and the transformer 3. Note that although n-channel MOSFETs equipped with body diodes will be described as examples of the synchronous rectification switches 31 and 32, the synchronous rectification switches 31 and 32 are not limited to this configuration and it is also possible to use a known configuration, such as a configuration where separate diodes are used in place of the body diodes.

Here, for the synchronous rectifier 51, the synchronous rectification switches 31 and 32, which are connected in series by having their source terminals connected together, are connected between the dot terminal, which is one end of the secondary winding $12_1$, and the non-dot terminal, which is the other end. In more detail, the drain terminal of the synchronous rectification switch 31 is connected to the dot terminal of the secondary winding $12_1$ and the drain terminal of the synchronous rectification switch 32 is connected to the non-dot terminal of the secondary winding $12_1$.

As one example, the smoothing circuit 61 includes a smoothing capacitor 41 and a coil 42 that are connected in series. This series circuit is connected in parallel with the synchronous rectification switch 31 and is configured as an LC filter that smoothes the voltage V1 (that is, a positive voltage where the potential at the source terminal is the reference potential and the drain terminal side is a high potential) outputted across the drain and source terminals of the synchronous rectification switch 31 and outputs as the DC voltage V2. The smoothing circuit $6_1$ outputs the DC voltage V2 from across the pair of output terminals $43_1$ and $44_1$ (also referred to as the "smoothing output terminals $43_1$ and $44_1$," to distinguish these terminals from other output terminals) that is, from across both ends of the smoothing capacitor 41 as a positive voltage that has the potential at the smoothing output terminal $44_1$ side as the reference potential (that is, a reference potential of a secondary-side circuit connected to the secondary winding $12_1$ (the circuit composed of the synchronous rectifier $5_1$, the smoothing circuit $6_1$, and the switch driver $7_1$) and the smoothing output terminal $43_1$ side as the high potential. Note that although not illustrated, a configuration with only the smoothing capacitor 41 may be used. In that case, the voltage V1 outputted from the synchronous rectifier 5 is immediately smoothed by the smoothing capacitor 41 and outputted as the DC voltage V2.

The switch driver $7_1$ drives the synchronous rectification switches 31 and 32 by operating on only voltages generated on the secondary side of the transformer 3 (that is, the AC voltage Vac generated in the secondary winding $12_1$, the DC voltage V2 generated by the smoothing circuit $6_1$ smoothing the voltage V1 outputted due to the synchronous rectifier $5_1$ synchronously rectifying the AC voltage Vac, and/or an AC voltage generated in an auxiliary winding formed in the transformer 3 together with the primary winding 11 and the secondary windings 12). As the switch driver $7_1$, it is possible to use a variety of known circuits.

As one example, it is possible to use a configuration in which synchronous rectification switches are connected to both ends of a secondary winding (secondary-side winding) in the manner of cross-coupled switches as described in Japanese Laid-open Patent Publication No. H11-69805. When applied to the configuration in the present embodiment, as depicted in FIG. 2, this configuration has the gate terminal of the synchronous rectification switch 31 whose drain terminal is connected to the dot terminal of the secondary winding $12_1$ connected to the non-dot terminal of the secondary winding $12_1$ and the gate terminal of the connected synchronous rectification switch 32 whose drain terminal is connected to the non-dot terminal of the secondary winding $12_1$ connected to the dot terminal of the secondary winding $12_1$. Here, a signal from the secondary winding $12_1$ that functions as the switch driver $7_1$ is inputted as a gate driving signal into the respective gate terminals of the synchronous rectification switches 31 and 32. This gate driving signal has the potential at the respective source terminals (that is, the potential at the smoothing output terminal $44_1$) as the reference potential.

Figure 3:
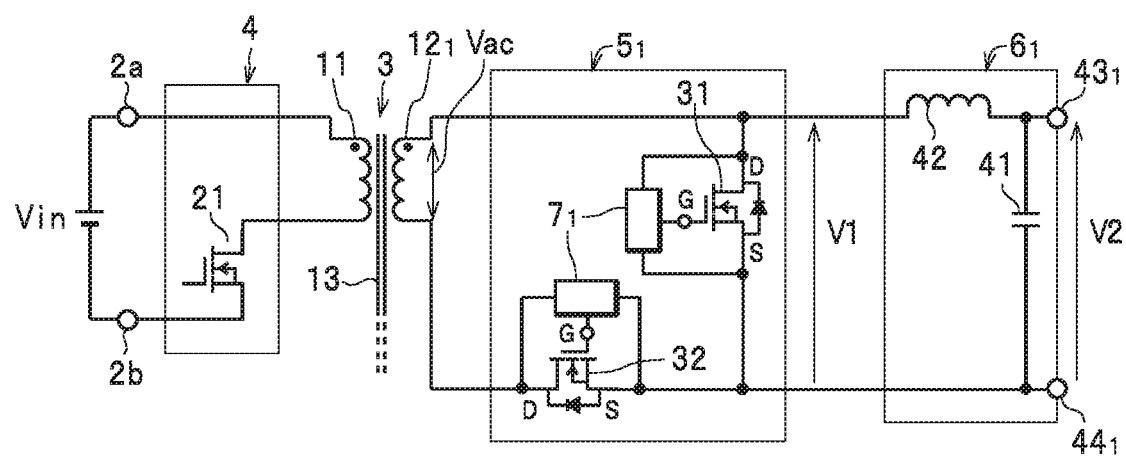
FIG. 3 is a diagram depicting other configurations of a secondary winding, a synchronous rectifier, and a smoothing circuit for a case where a single-ended forward configuration is used for a primary-side switch and a transformer.

It is also possible to use a different configuration that uses a gate circuit like that described in Japanese Patent Laid-Open No. H11-69805. When applied to the configuration in the present embodiment, as depicted in FIG. 3, a gate circuit that detects the voltage between the drain and source terminals of the corresponding synchronous rectification switch and drives the gate terminal of the corresponding synchronous rectification switch is connected as the switch driver $7_1$ to the synchronous rectification switches 31 and 32. Here, a signal from the gate circuit that functions as the switch driver $7_1$ is inputted as the gate driving signal into the respective gate terminals of the synchronous rectification switches 31 and 32. This gate driving signal has the potential at the respective source terminals (that is, the potential at the smoothing output terminal $44_1$) as the reference potential.

Figure 4:
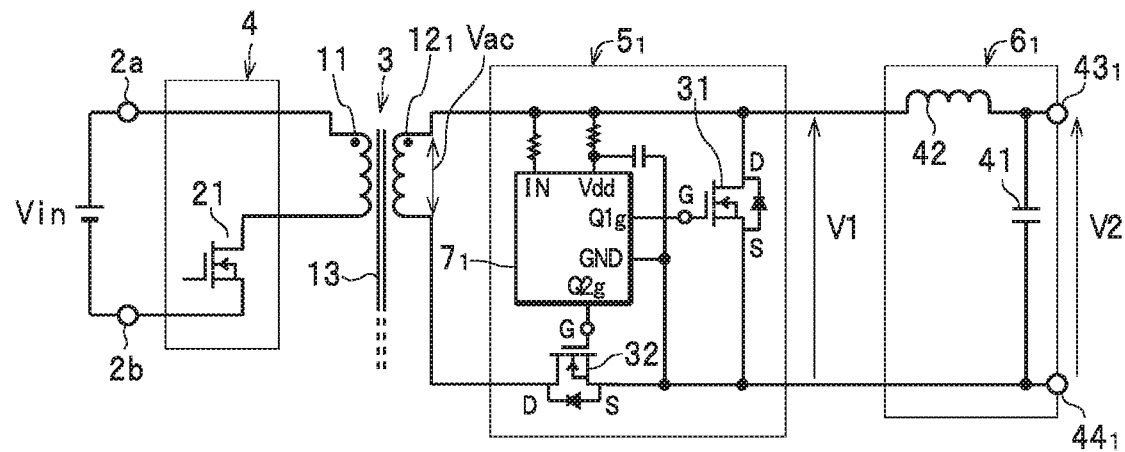
FIG. 4 is a diagram depicting yet other configurations of a secondary winding, a synchronous rectifier, and a smoothing circuit for a case where a single-ended forward configuration is used for a primary-side switch and a transformer.

It is also possible to use another configuration that uses a gate driving circuit like that described in Japanese Laid-open Patent Publication No. H11-69805. When applied to the configuration in the present embodiment, as depicted in FIG. 4, a gate driving circuit, which generates and operates on an operating voltage (Vdd) based on the voltage generated at the dot terminal with the potential at the source terminals of the synchronous rectification switches 31 and 32 as the reference potential to drive the gate terminals of the synchronous rectification switches 31 and 32, is connected between the dot terminal and the non-dot terminal of the secondary winding $12_1$ as the switch driver $7_1$. Here also, a signal from the gate driving circuit that functions as the switch driver $7_1$ is inputted as the gate driving signal into the respective gate terminals of the synchronous rectification switches 31 and 32. This gate driving signal has the potential at the respective source terminals (that is, the potential at the smoothing output terminal $44_1$) as the reference potential.

Figure 5:
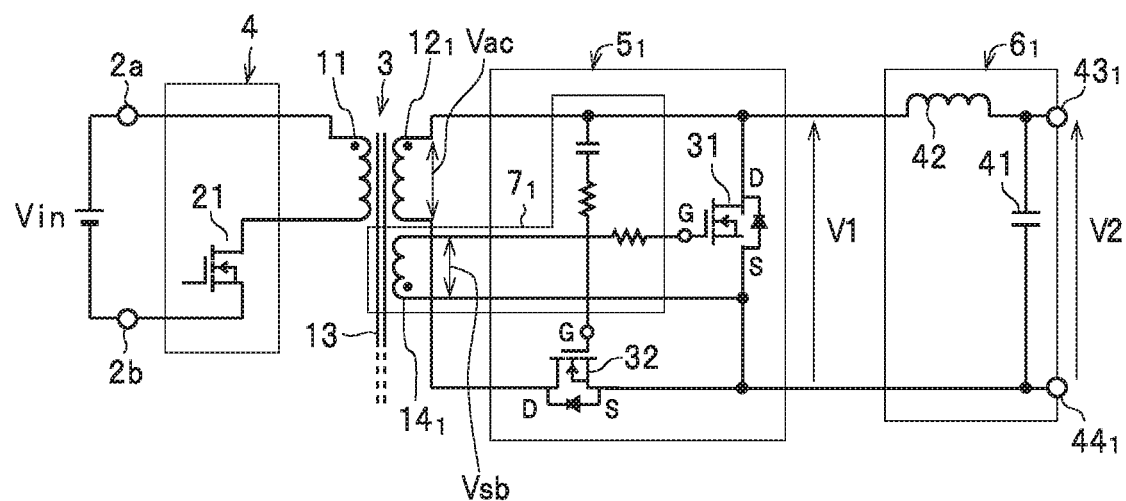
FIG. 5 is a diagram depicting yet other configurations of a secondary winding, a synchronous rectifier, and a smoothing circuit for a case where a single-ended forward configuration is used for a primary-side switch and a transformer.

It is also possible to use a configuration that uses one of a variety of gate driving circuits (gate driving circuits that use an auxiliary winding) disclosed in Japanese Laid-open Patent Publication No. 2016-63733. As an example that has been applied to the configuration in the present embodiment, as depicted in FIG. 5, an auxiliary winding $14_1$ that is magnetically coupled to the secondary winding $12_1$ is provided in the transformer 3 for each secondary winding $12_1$ (that is, corresponding to each secondary winding $12_1$). A series circuit composed of the auxiliary winding $14_1$ and a resistor is connected between the gate terminal and the source terminal of the synchronous rectification switch 31 and a series circuit composed of a capacitor and a resistor is connected between the dot terminal of the secondary winding $12_1$ and the gate terminal of the synchronous rectification switch 32, thereby constructing the switch driver $7_1$. Here also, the AC voltage Vac generated in the secondary winding $12_1$ that functions as the switch driver $7_1$ or a voltage (the AC voltage Vsb) generated in the auxiliary winding $14_1$ is inputted as a gate driving signal into the respective gate terminals of the synchronous rectification switches 31 and 32. This gate driving signal has the potential at the respective source terminals (that is, the potential at the smoothing output terminal $44_1$) as the reference potential.

Figure 6:
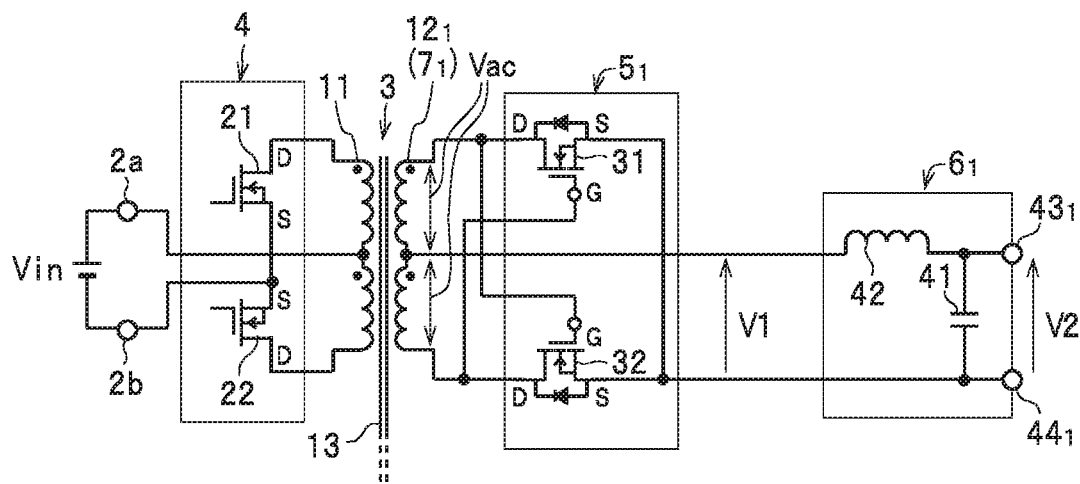
FIG. 6 is a diagram depicting configurations of a secondary winding, a synchronous rectifier, and a smoothing circuit for a case where a push-pull configuration is used for a primary-side switch and a transformer.

Next, the respective configurations of the primary winding 11, the secondary winding $12_1$, the synchronous rectifier $5_1$, and the smoothing circuit $6_1$ will be described for a case where the circuit configuration (a push-pull configuration) depicted in FIG. 6 is used for the primary-side switch 4 and the transformer 3.

In this case, the primary-side switch 4 is configured to include the main switch 21 and another main switch 22 that is the same as the main switch 21. In the transformer 3, the primary winding 11 is provided with a center tap and the secondary winding $12_1$ is also provided with a center tap. For the main switches 21 and 22, the drain terminal of the main switch 21 is connected to one terminal of the primary winding 11, the drain terminal of the main switch 22 is connected to the other terminal of the primary winding 11, and the respective source terminals are connected to the input terminal 2b. The center tap of the primary winding 11 is connected to the input terminal 2a.

In the synchronous rectifier $5_1$, the source terminals of the synchronous rectification switches 31 and 32 are connected to each other. The synchronous rectification switch 31 has a drain terminal connected to one terminal of the secondary winding 121, and the synchronous rectification switch 32 has a drain terminal connected to the other terminal of the secondary winding $12_1$. In the smoothing circuit $6_1$, a series circuit composed of the smoothing capacitor 41 and the coil 42 is connected between the center tap of the secondary winding $12_1$ and the respective source terminals of the synchronous rectification switches 31 and 32 and is therefore configured as an LC filter for smoothing the voltage V1 outputted between the center tap and the source terminals to produce the DC voltage V2. With this configuration, the smoothing circuit $6_1$ outputs the DC voltage V2 as a positive voltage that has the potential of the smoothing output terminal 441 side as a reference potential and is such that the smoothing output terminal $43_1$ side becomes a high potential from across the smoothing output terminals $43_1$ and $44_1$ (that is, from across both ends of the smoothing capacitor 41). Note that although not depicted, a configuration with only the smoothing capacitor 41 may be used.

As one example, although the switch driver $7_1$ is constructed using the configuration described above where the synchronous rectification switches are connected to both ends of a secondary winding (or "secondary-side winding") as a cross-coupled switch (when applied to the configuration in the present embodiment, as depicted in FIG. 6, a gate terminal of the synchronous rectification switch 31 whose drain terminal is connected to one terminal of the secondary winding $12_1$ is connected to the other terminal of the secondary winding $12_1$ and a gate terminal of the synchronous rectification switch 32 whose drain terminal is connected to the other terminal of the secondary winding $12_1$ is connected to one terminal of the secondary winding 121), the present invention is not limited to this. Although not illustrated, it is also possible to use a configuration where a driving circuit like that depicted in FIGS. 3 and 4 described above is used as the switch driver $7_1$.

Figure 7:
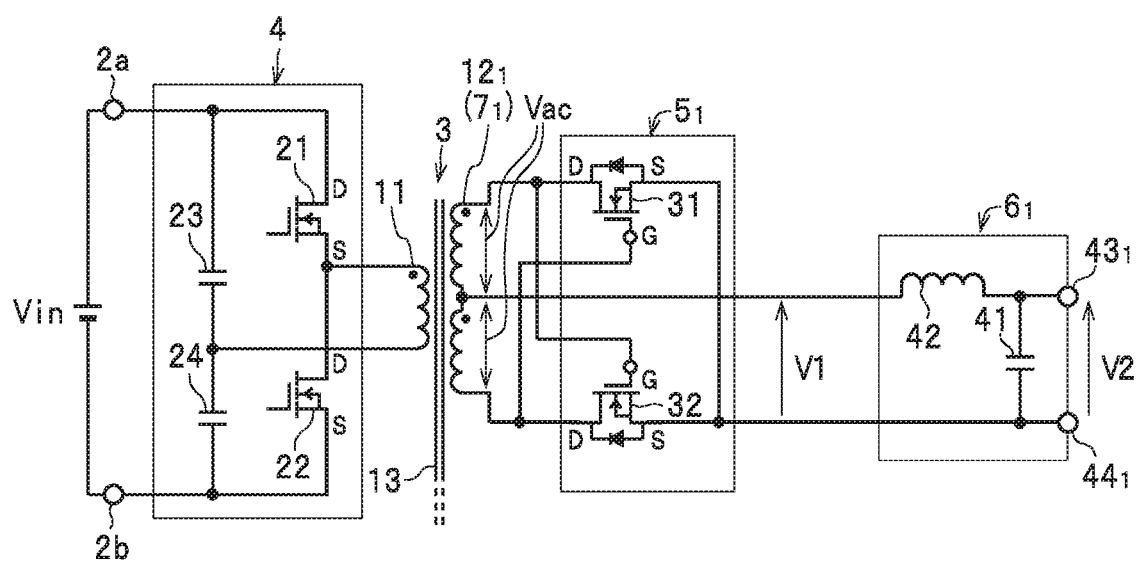
FIG. 7 is a diagram depicting configurations of a secondary winding, a synchronous rectifier, and a smoothing circuit for a case where a half-bridge configuration is used for a primary-side switch and a transformer.

Next, the respective configurations of the primary winding 11, the secondary winding 121, the synchronous rectifier 51, and the smoothing circuit 61 will be described for a case where the circuit configuration (a half-bridge configuration) depicted in FIG. 7 is used for the primary-side switch 4 and the transformer 3. Note that since the circuits on the secondary side of the transformer 3 (the secondary winding $12_1$, the synchronous rectifier 51, and the smoothing circuit $6_1$) are the same as the circuits depicted in FIG. 6 described above, the same reference numerals have been assigned and duplicated description is omitted.

Here, the primary-side switch 4 includes the main switch 21, another main switch 22 that is the same as the main switch 21, and two capacitors 23 and 24 of the same specification. The two main switches 21 and 22 are directly connected with the drain terminal of the main switch 22 connected to the source terminal of the main switch 21 and are connected between the input terminals 2a and 2b in a state where the main switch 21 becomes the high potential side and the main switch 22 side becomes the low potential side. The capacitors 23 and 24 are connected between the input terminals 2a and 2b in a state where the capacitors 23 and 24 are directly connected to each other. The dot terminal of the primary winding 11 is connected to a connection point between the main switches 21 and 22 (that is, the source terminal of the main switch 21) and the non-dot terminal is connected to a connection point between the capacitors 23 and 24.

Figure 8:
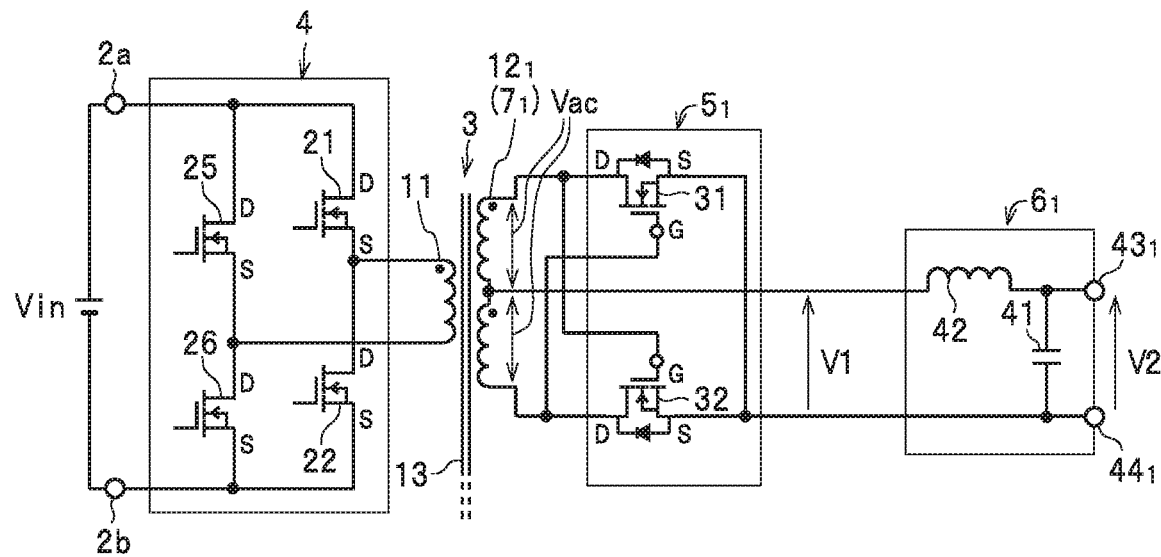
FIG. 8 is a diagram depicting configurations of a secondary winding, a synchronous rectifier, and a smoothing circuit for a case where a full-bridge configuration is used for a primary-side switch and a transformer.

Next, the respective configurations of the primary winding 11, the secondary winding $12_1$, the synchronous rectifier $5_1$, and the smoothing circuit 61 will be described for a case where the circuit configuration (that is, a full-bridge configuration) depicted in FIG. 8 is used for the primary-side switch 4 and the transformer 3. Note that since the circuits on the secondary side of the transformer 3 (that is, the secondary winding $12_1$, the synchronous rectifier $5_1$, and the smoothing circuits 61) are the same as the circuits depicted in FIG. 6 described above, the circuits have been assigned the same reference numerals and duplicated description has been omitted.

In this case, the primary-side switch 4 includes the main switch 21 and three other main switches 22, 25, and 26 that are the same as the main switch 21. The two main switches 21 and 22 are directly connected with the drain terminal of the main switch 22 connected to the source terminal of the main switch 21 and are connected between the input terminals 2a and 2b in a state where the main switch 21 side becomes the high potential side and the main switch 22 side becomes the low potential side. The other two main switches 25 and 26 are also directly connected with the drain terminal of the main switch 26 connected to the source terminal of the main switch 25 and are connected between the input terminals 2a and 2b in a state where the main switch 25 side becomes the high potential side and the main switch 26 side becomes the low potential side. The dot terminal of the primary winding 11 is connected to a connection point between the main switches 21 and 22 (that is, the source terminal of the main switch 21) and the non-dot terminal is connected to a connection point between the main switches 25 and 26 (that is, the source terminal of the main switch 25).

As depicted in FIG. 1, the output connector 8 is disposed as a following stage for the plurality of smoothing circuits (in the present embodiment, the three smoothing circuits $6_1$, $6_2$, and $6_3$) and connects the outputs of the smoothing circuits $6_1$, $6_2$, and $6_3$ (that is, the smoothing output terminals $43_1$ and $44_1$ of the smoothing circuit $6_1$, the smoothing output terminals $43_2$ and $44_2$ of the smoothing circuit $6_2$, and the smoothing output terminals $43_3$ and $44_3$ of the smoothing circuit $6_3$) in a connection pattern selected out of parallel connection and serial connection across the output terminals 9a and 9b to change the voltage value of the final DC output voltage Vout and the maximum value of the output current Iout outputted as the power supply 1 from the output terminals 9a and 9b. By using this configuration, the power supply 1 converts the DC voltage V2 outputted from the respective smoothing circuits $6_1$, $6_2$, and $6_3$ to a DC output voltage Vout that corresponds to the selected connection pattern described above, which is outputted. That is, when the selected connection pattern is parallel connection, the DC voltage V2 is outputted as it is as the DC output voltage Vout, while when the selected connection pattern is serial connection, a voltage produced by adding the DC voltage V2 a number of times equal to the number of smoothing circuits 6 is outputted as the DC output voltage Vout (in the present embodiment, a voltage that is three times the DC voltage V2).

In more detail, the output connector 8 includes wiring 51 that connects the high potential-side smoothing output terminal (in the present embodiment, the smoothing output terminal $43_1$ of the smoothing circuit $6_1$) out of the pair of smoothing output terminals of the smoothing circuit disposed closest to the high potential side out of the plurality of smoothing circuits (in the present embodiment, the three smoothing circuits $6_1$, $6_2$, and $6_3$) in the serial connection state to the output terminal 9a, wiring $5_2$ that is connected to the low potential-side smoothing output terminal (in the present embodiment, the smoothing output terminal $44_1$ of the smoothing circuit $6_1$) out of the pair of smoothing output terminals of the smoothing circuit disposed closest to the high potential side, wiring 53 that connects the low potential-side smoothing output terminal (in the present embodiment, the smoothing output terminal $44_3$ of the smoothing circuit $6_3$) out of the pair of smoothing output terminals of the smoothing circuit disposed closest to the low potential side to the output terminal 9b, and wiring 54 that is connected to the high potential-side smoothing output terminal (in the present embodiment, the smoothing output terminal $43_3$ of the smoothing circuit $6_3$) out of the pair of smoothing output terminals of the smoothing circuit disposed closest to the low potential side.

The output connector 8 also includes wiring 55 that is connected to the high potential-side smoothing output terminal (in the present embodiment, the smoothing output terminal $43_2$ of the smoothing circuit $6_2$) out of the pair of smoothing output terminals of a smoothing circuit aside from the smoothing circuit disposed closest to the high potential side and the smoothing circuit disposed closest to the low potential side, and wiring 56 connected to the low potential-side smoothing output terminal (in the present embodiment, the smoothing output terminal $44_2$ of the smoothing circuit $6_2$) out of the pair of smoothing output terminals of each smoothing circuit.

The output connector 8 includes a connector portion 57 that connects the wiring 54 to the wiring 51, a connector portion 58 that connects the wiring 55 to the wiring 51, a connector portion 59 that connects the wiring $5_2$ to the wiring 53, a connector portion 60 that connects the wiring 56 to the wiring 53, a connector portion 61 that connects the wiring $5_2$ to the wiring 55, and a connector portion 62 that connects the wiring 56 to the wiring 54.

In more detail, when the wiring 51 to 56 construct a wiring pattern formed on a circuit board, the connector portions 57 to 62 may each be a pair of through-holes adjacently formed to connect the corresponding wiring together or a pair of pin headers that are adjacently erected. When each of the connector portions 57 to 62 is constructed of a pair of through-holes, a jumper wire (a ferrous or non-ferrous metal wire, such as a copper wire) may be provided on the pair of through-holes using solder or the like to produce a short circuit across the through-holes and thereby connect the wiring together. When each of the connector portions 57 to 62 is constructed of a pair of pin headers, a shorting connector may be provided on the pair of pin headers to produce a short circuit across the pin headers and thereby connect the wiring together.

Next, the usage method and operation of the power supply 1 will be described.

First, the usage method and operation will be described for a case where the DC output voltage Vout outputted from across the output terminals 9a and 9b of the power supply 1 is changed to three times (=3×V2) the DC voltage V2.

Here, the outputs of the smoothing circuits $6_1$, $6_2$, and $6_3$ (that is, the smoothing output terminals $43_1$ and $44_1$ of the smoothing circuit 61, the smoothing output terminals $43_2$ and $44_2$ of the smoothing circuit $6_2$, and the smoothing output terminals $43_3$ and $44_3$ of the smoothing circuit $6_3$) are connected across the output terminals 9a and 9b having been connected in series in the output connector 8. In more detail, by shorting only the two connector portions 61 and 62 out of the connector portions 57 to $6_2$, the outputs of the smoothing circuits $6_1$, $6_2$, and $6_3$ are connected in series and then connected across the output terminals 9a and 9b.

By doing so, the power supply 1 of this configuration outputs a DC output voltage Vout that is three times (=3×V2) the DC voltage V2 from across the output terminals 9a and 9b. Also, in the power supply 1 of this configuration, since the secondary-side circuits that are connected to the secondary windings $12_1$, $12_2$, and $12_3$ of the transformer 3 are connected to each other in series, it is possible to output an output current Iout with the same maximum value as the maximum value of the output current of each secondary-side circuit from across the output terminals 9a and 9b.

Here, in this serial connection state, the smoothing output terminal 433 on the high potential side of the smoothing circuit $6_3$ disposed closest to the low potential side is connected to the smoothing output terminal $44_2$ on the low potential side of the smoothing circuit 62 (the terminal that becomes the reference potential of the secondary-side circuit connected to the secondary winding $12_2$ of the transformer 3) and the smoothing output terminal $43_2$ on the high potential side of the smoothing circuit $6_2$ is connected to the smoothing output terminal $44_1$ on the low potential side of the smoothing circuit $6_1$ that is disposed closest to the high potential side (the terminal that becomes the reference potential of the secondary-side circuit connected to the secondary winding $12_1$ of the transformer 3). However, as described above, in each secondary-side circuit connected to the secondary windings $12_1$, $12_2$, and $12_3$ of the transformer 3, the switch drivers $7_1$, $7_2$, and $7_3$ operate based on a voltage that is based on the reference potential of that secondary-side circuit (the AC voltage Vac and/or the DC voltages V1, V2 or the like) and output the gate driving signals based on the reference potential in the secondary-side circuits to the synchronous rectification switches 31 and 32 included in the corresponding synchronous rectifiers $5_1$, $5_2$, and $5_3$ to drive the synchronous rectification switches 31 and 32.

Therefore, since this power supply 1 has a synchronous rectification-type rectifying and smoothing circuit composed of the synchronous rectifiers 5 and the smoothing circuits 6, the conversion efficiency for the DC voltage V2 and in turn the DC output voltage Vout (=3×V2) is increased. By also making it possible to use low-cost field effect transistors that have low durability for high gate voltages as the synchronous rectification switches 31 and 32, it becomes possible to change the DC output voltage Vout from the power supply 1 to three times the DC voltage V2 while avoiding an increase in product cost.

Next, the usage method and operation when the DC output voltage Vout outputted from across the output terminals 9a and 9b of the power supply 1 is changed to the same voltage as the DC voltage V2 and the maximum value of the output current Iout outputted from across the output terminals 9a and 9b is changed to three times the maximum value of the output current of each secondary-side circuit will be described.

In this case, the outputs of the respective smoothing circuits $6_1$, $6_2$, and $6_3$ (that is, the smoothing output terminals $43_1$ and $44_1$ of the smoothing circuit $6_1$, the smoothing output terminals $43_2$ and $44_2$ of the smoothing circuit $6_2$, and the smoothing output terminals $43_3$ and $44_3$ of the smoothing circuit $6_3$) are connected across the output terminals 9a and 9b having been connected in parallel in the output connector 8. In more detail, by shorting only the four connector portions 57, 58, 59, and 60 out of the connector portions 57 to 62, the outputs of the smoothing circuits $6_1$, $6_2$, and $6_3$ are connected in parallel and connected between the output terminals 9a and 9b.

By doing so, with the power supply 1 of this configuration, it is possible to output an output current Iout with a maximum current value that is three times the maximum value of the output currents of the respective secondary-side circuits from across the output terminals 9a and 9b. That is, it is possible to change the maximum value of the output current Iout that can be outputted from across the output terminals 9a and 9b to three times the maximum value of the output currents of the respective secondary-side circuits. In addition, since the power supply 1 of this configuration has the respective secondary-side circuits that are connected to the secondary windings $12_1$, $12_2$, and $12_3$ of the transformer 3 connected in parallel, the DC voltage V2 of each secondary-side circuit is outputted as it is from across the output terminals 9a and 9b as the DC output voltage Vout.

Accordingly, the power supply 1 has a synchronous rectification-type rectifying and smoothing circuit composed of the synchronous rectifiers 5 and the smoothing circuits 6, increases the conversion efficiency of the output current from each secondary-side circuit, and in turn of the output current Iout from across the output terminals 9a and 9b, and makes it possible to use low-cost field effect transistors that have low durability for high gate voltages as the synchronous rectification switches 31 and 32. By doing so, it is possible to avoid an increase in product cost while making it possible to change the output current Iout from the power supply 1 to three times the output current from each secondary-side circuit.

In this way, with the power supply 1, in each secondary-side circuit connected to the secondary windings $12_1$, $12_2$, and $12_3$ of the transformer 3, the switch drivers $7_1$, $7_2$, and $7_3$ operate based on voltages (the AC voltage Vac generated in the corresponding one of the secondary windings $12_1$, $12_2$, and $12_3$ and the DC voltages V2 outputted from the corresponding one of the smoothing circuits $6_1$, $6_2$, and $6_3$) that have the reference potential in each secondary-side circuit as a reference and output gate driving signals based on the reference potential in that secondary-side circuit to the synchronous rectification switches 31 and 32 included in the corresponding synchronous rectifiers $5_1$, $5_2$, and $5_3$ to drive the synchronous rectification switches 31 and 32.

Accordingly, since the power supply 1 includes a synchronous rectification-type rectifying and smoothing circuit composed of the synchronous rectifiers 5 and the smoothing circuits 6, it is possible to increase the conversion efficiency of the output voltage and output current from each secondary-side circuit and in turn the conversion efficiency of the DC output voltage Vout and output current Iout from across the output terminals 9a and 9b. By also making it possible to use low-cost field effect transistors that have durability for high gate voltages as the synchronous rectification switches 31 and 32, it is possible to avoid an increase in product cost and possible, by selecting the connector portions to be shorted out of the connector portions 57 to 62 included in the output connector 8 disposed following the smoothing circuits $6_1$, $6_2$, and $6_3$, to change the DC output voltage Vout outputted from across the output terminals 9a and 9b and/or to change the maximum value of the output current Iout from across the output terminals 9a and 9b.

Note that although an example where the number of secondary-side circuits (that is, circuits composed of a synchronous rectifier 5, a smoothing circuit 6, and a switch driver 7) for the transformer 3 is set at three has been described, the number may be two or may be four or more. Also, while an example where there is one transformer 3 has been described, although not illustrated, it is also possible to use a configuration that is equipped with an equal number of transformers of the same specification as the number of secondary-side circuits and that has the primary winding of each transformer driven at the same time using a shared primary-side switch 4. Since it is possible to use a variety of well-known circuits as the control circuit that executes switching control of the primary-side switch 4 based on the DC voltage V2 outputted from the secondary-side circuit of the transformer 3, description thereof is omitted here.

Also, although the concept of one secondary winding 12 has been described in the above example as including a configuration equipped with a center tap and a configuration not equipped with a center tap, the concept of "one secondary winding 12" is assumed to also include a configuration where a plurality of windings that are formed with the same number of turns are provided on a single magnetic core 13 and are connected in parallel with their poles aligned.

It is possible to use the power supply 1 in a medical system by connecting the output terminals 9a and 9b to a medical appliance that operates based on the DC output voltage Vout.

Figure 9:
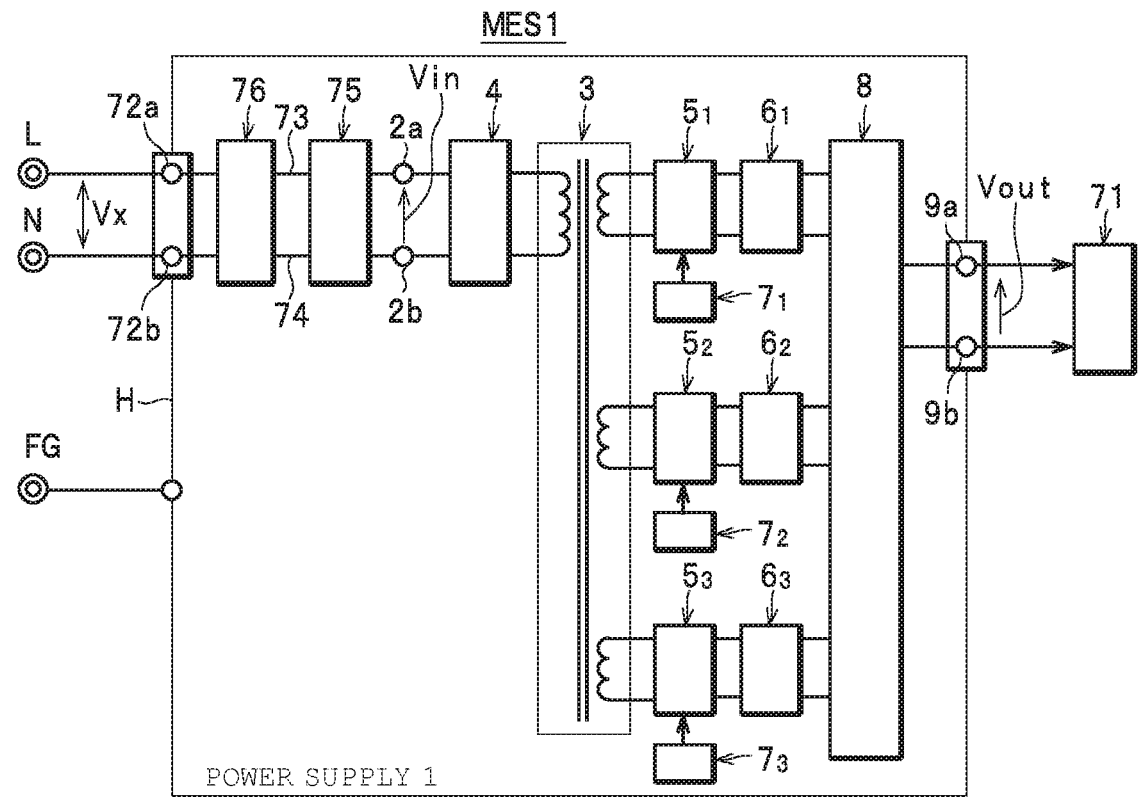
FIG. 9 is a diagram depicting a medical system equipped with a power supply.

A medical system MES1 equipped with the power supply 1 will now be described with reference to FIG. 9. Note that it is assumed here that the transformer 3 of the power supply 1 is sufficiently isolated to meet medical standards (that is, the transformer 5 has reinforced insulation). It is further assumed that a medical appliance $7_1$ is connected to the output terminals 9a and 9b and that an FG line for grounding is connected to a housing H of the power supply 1. Configurations that are the same as the configurations of the power supply 1 described above have been assigned the same reference numerals and duplicated description is omitted.

In this system, the power supply 1 operates by inputting an AC input voltage Vx supplied from across input lines (an L-phase line and an N-phase line) via a pair of AC input terminals 72a and 72b as the pair of input terminals. To do so, the power supply 1 internally includes a rectifying and smoothing circuit 75 connected via a pair of power supply lines 73 and 74 to the pair of AC input terminals 72a and 72b, and is configured so that the rectifying and smoothing circuit 75 rectifies and smoothes the AC input voltage Vx inputted via the input lines L and N, the pair of AC input terminals 72a and 72b, and the pair of power supply lines 73 and 74 to generate the DC input voltage Vin, which is outputted to the primary-side switch 4. The rectifying and smoothing circuit 75 may be configured to include a power factor correction circuit (or "PFC circuit"). The power supply 1 also internally includes a fuse 76 (or breaker) that is interposed on the pair of power supply lines 73 and 74.

According to the medical system MES1 equipped with the power supply 1, the power supply 1 is equipped with the transformer 3 that has reinforced insulation and the fuse 76 as described above and is configured so as to be capable of meeting medical standards by itself. This means that it is possible to realize a configuration capable of meeting medical standards without an isolation transformer and a fuse (or breaker) being provided outside the power supply 1 (in more detail, on the input lines (the L-phase line and N-phase line) connected to the power supply 1). Also, according to the medical system MES1, by including the power supply 1, it is possible to achieve the same effects as the power supply 1 alone described above.

Also, although the power supply 1 in the medical system MES1 described above internally includes the fuse 76 (or breaker), it is also possible to configure a medical system using a power supply 1 that does not internally include the fuse 76 (or breaker). A medical system MES2 that uses this configuration will now be described with reference to FIG. 10. Note that configurations that are the same as the medical system MES1 described above have been assigned the same reference numerals and duplicated description is omitted, with the following description instead focusing on configurations that differ to the medical system MES1.

Figure 10:
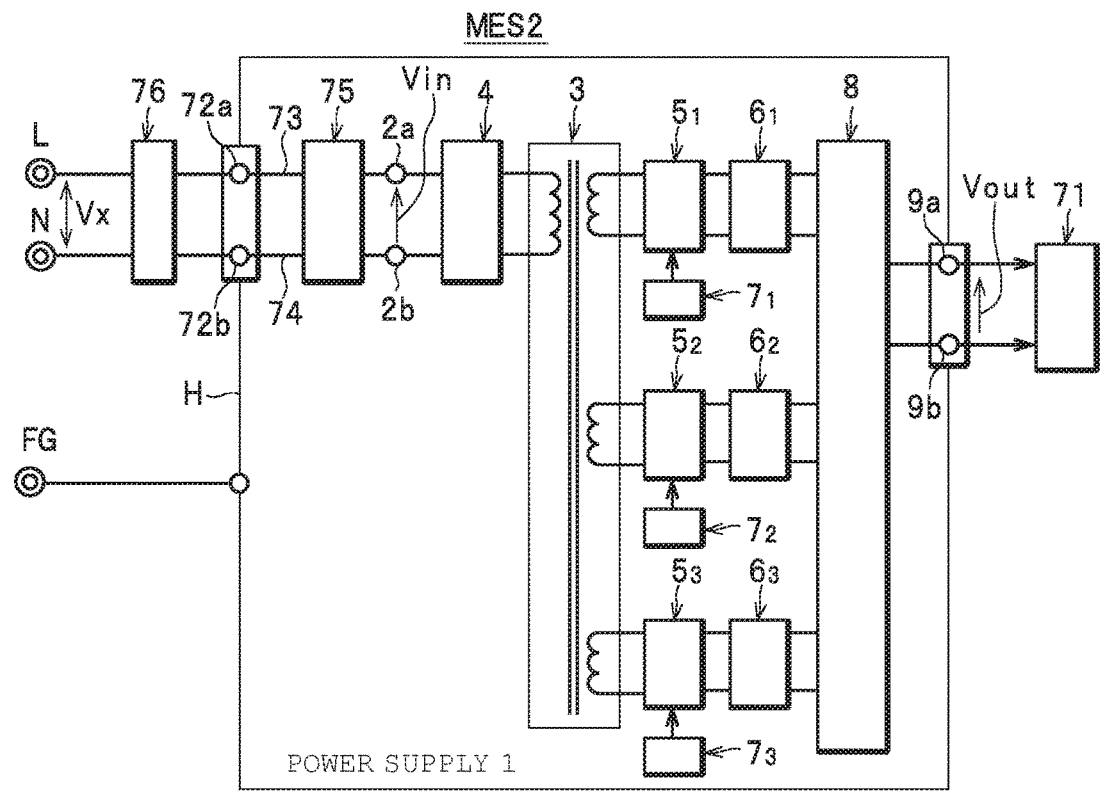
FIG. 10 is a diagram depicting another medical system equipped with a power supply.

As depicted in FIG. 10, in this medical system MES2, the fuse 76 (or breaker) is interposed on the input lines (the L-phase line and the N-phase line). With this configuration, the AC input voltage Vx supplied from across the input lines (the L-phase line and the N-phase line) is inputted into the AC input terminals 72a and 72b of the power supply 1 via the fuse 76 (or breaker).

According to the medical system MES2 equipped with the power supply 1, since the power supply 1 includes the transformer 3 that has reinforced insulation as described above, it is possible to realize a configuration capable of meeting medical standards by merely providing the fuse 76 (or breaker) outside the power supply 1 (in more detail, on the input lines (the L-phase line and N-phase line) connected to the power supply 1). Also, according to the medical system MES2, by including the power supply 1, it is possible to achieve the same effects as the power supply 1 alone described above.

Figure 11:
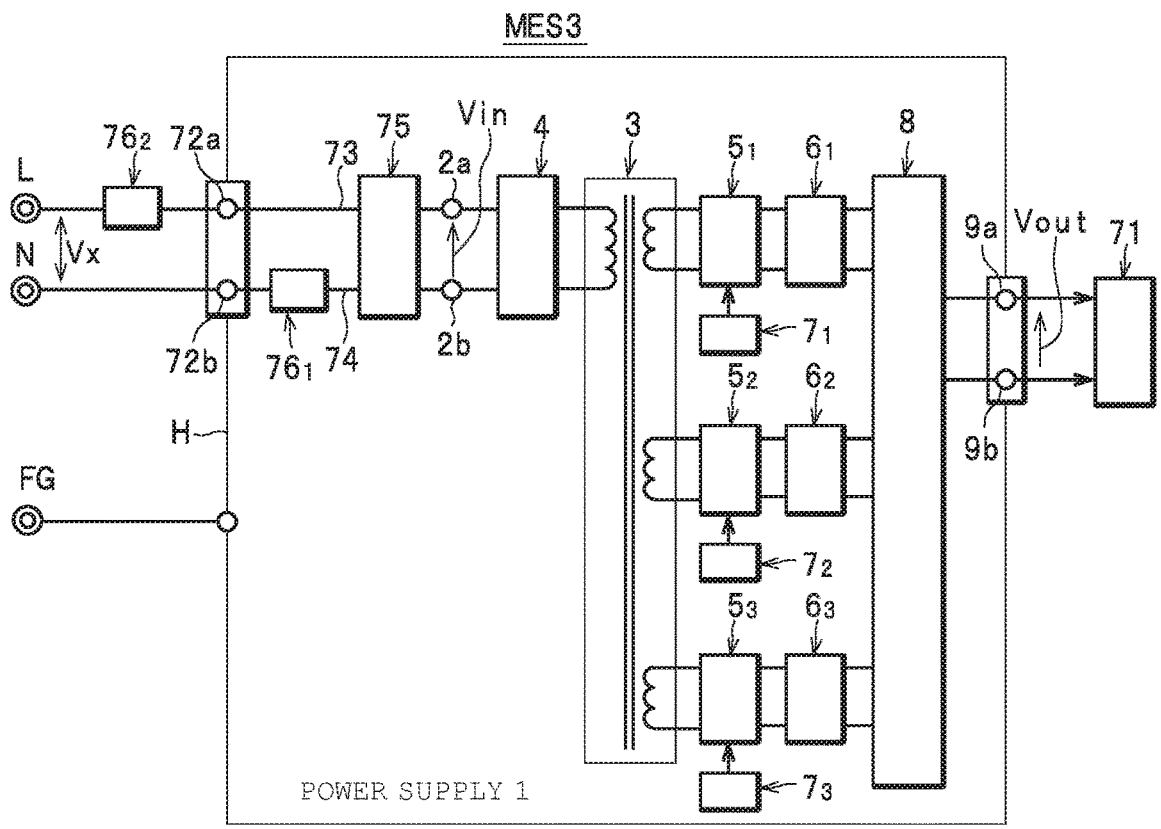
FIG. 11 is a diagram depicting another medical system equipped with a power supply.

Although the medical systems MES1 and MES2 described above are configured with the fuse 76 (or breaker) interposed only one of inside and outside the power supply 1, it is also possible to use a configuration where a fuse 76 (or breaker) is interposed both inside and outside the power supply 1. A medical system MES3 that uses this configuration will now be described with reference to FIG. 11. Note that configurations that are the same as the medical systems MES1 and MES2 described above have been assigned the same reference numerals and duplicated description is omitted, with the following description instead focusing on configurations that differ to the medical systems MES1 and MES2.

In the medical system MES3, the power supply 1 internally includes a fuse 761 as a first fuse (or a breaker as a first breaker) that is interposed on one power supply line (as one example in the present embodiment, the power supply line 74) out of the pair of power supply lines 73 and 74. Additionally, a fuse $76_2$ as a second fuse (or a breaker as a second breaker) is disposed outside the power supply 1 in a state where the fuse $76_2$ is interposed on an input line (in the present embodiment, the L-phase line) connected via an input terminal (in the present embodiment, the AC input terminal 72a) to the other power supply line (as one example in the present embodiment, the power supply line 73) out of the pair of power supply lines 73 and 74. Note that although not illustrated, it is also possible to use a configuration where the fuse $76_1$ as the first fuse (or a breaker as the first breaker) is interposed on the power supply line 73 and corresponding to this, the fuse $76_2$ as the second fuse (or a breaker as the second breaker) is interposed on the N-phase line.

According to the medical system MES3 equipped with the power supply 1, since the power supply 1 internally includes the transformer 3 that has reinforced insulation as described above and the fuse $76_1$ (breaker) interposed on one power supply line (the power supply line 74 or the power supply line 73), by merely interposing the other fuse $76_2$ (or breaker) outside the power supply 1 (in more detail, on the input line (the L-phase line or the N-phase line) connected to the other power supply line out of the input lines (the L-phase line and the N-phase line) connected to the power supply 1), it is possible to realize a configuration capable of meeting medical standards. Also, according to the medical system MES3, by including the power supply 1, it is possible to achieve the same effects as the power supply 1 alone described above.

What is claimed is:

1. A power supply, comprising:
a transformer including a primary winding and a plurality of secondary windings that are formed with a same number of turns;
a primary-side switch that intermittently applies a direct current (DC) voltage to the primary winding;
a plurality of synchronous rectifiers that are equal in number to the plurality of secondary windings, which have a same configuration including a synchronous rectification switch, which are respectively connected to the plurality of secondary windings, and which each perform synchronous rectification of an alternating current (AC) voltage generated in the corresponding secondary winding;
a plurality of smoothing circuits that are equal in number to the secondary windings, which have a same configuration including a smoothing capacitor, which are respectively connected to the plurality of synchronous rectifiers, and which each smooth a voltage outputted by the corresponding synchronous rectifier and output as a DC voltage;

a plurality of switch drivers that are provided to correspond one-to-one to the plurality of synchronous rectifiers, which operate on one or both of the DC voltages outputted from the smoothing circuit connected to the corresponding synchronous rectifier and the AC voltage generated in the corresponding secondary winding connected to the synchronous rectifier, and drive the synchronous rectification switches that construct the corresponding synchronous rectifier; and an output connector that is disposed following the plurality of smoothing circuits and that connects outputs of the plurality of smoothing circuits in a connection pattern selected out of parallel connection and serial connection, wherein the DC voltage outputted from the plurality of smoothing circuits is outputted having been converted to an output voltage corresponding to the selected connection pattern.

2. A power supply, comprising:

a transformer including a primary winding, a plurality of secondary windings that are formed with a same number of turns, and a plurality of auxiliary windings that are equal in number to the secondary windings, that one-to-one correspond to the secondary windings, and are formed with a same number of turns;

a primary-side switch that intermittently applies a DC voltage to the primary winding;

a plurality of synchronous rectifiers that are equal in number to the plurality of secondary windings, which have a same configuration including a synchronous rectification switch, which are respectively connected to the plurality of secondary windings, and which each perform synchronous rectification of an AC voltage generated in the corresponding secondary winding;

a plurality of smoothing circuits that are equal in number to the secondary windings, which have a same configuration including a smoothing capacitor, which are respectively connected to the plurality of synchronous rectifiers, and which each smooth a voltage outputted by the corresponding synchronous rectifier and output as a DC voltage;

a plurality of switch drivers that are provided to correspond one-to-one to the plurality of synchronous rectifiers, which operate on one or both of the DC voltages outputted from the smoothing circuit connected to the corresponding synchronous rectifier and the AC voltage generated in the corresponding secondary winding connected to the synchronous rectifier and also on a voltage generated in the auxiliary winding corresponding to a corresponding second winding of the plurality of secondary windings, and which drive the synchronous rectification switches that construct the corresponding synchronous rectifier; and an output connector that is disposed following the plurality of smoothing circuits and that connects outputs of the plurality of smoothing circuits in a connection pattern selected out of parallel connection and serial connection, wherein the DC voltage outputted from the plurality of smoothing circuits is outputted having been converted to an output voltage corresponding to the selected connection pattern.

3. A medical system, comprising:

the power supply according to claim 1, which further includes a pair of input terminals connected to an input line, a rectifying and smoothing circuit that is connected via a pair of power supply lines to the pair of input terminals, rectifies and smoothes an AC input voltage inputted via the input line, the pair of input terminals, and the pair of power supply lines, and outputs to the primary-side switch, and a fuse or breaker interposed on the pair of power supply lines; and a medical appliance that is connected downstream of the power supply and operates based on the output voltage from the power supply.

4. A medical system, comprising:

the power supply according to claim 2, which further includes a pair of input terminals connected to an input line, a rectifying and smoothing circuit that is connected via a pair of power supply lines to the pair of input terminals, rectifies and smoothes an AC input voltage inputted via the input line, the pair of input terminals, and the pair of power supply lines, and outputs to the primary-side switch, and a fuse or breaker interposed on the pair of power supply lines; and a medical appliance that is connected downstream of the power supply and operates based on the output voltage from the power supply.

5. A medical system, comprising:

the power supply according to claim 1, which further includes a pair of input terminals connected to an input line and a rectifying and smoothing circuit that is connected to the pair of input terminals and rectifies and smoothes an AC input voltage inputted via the input line and the pair of input terminals and outputs to the primary-side switch;

a fuse or breaker interposed on the input line; and a medical appliance that is connected downstream of the power supply and operates based on the output voltage from the power supply.

6. A medical system, comprising:

the power supply according to claim 2, which further includes a pair of input terminals connected to an input line and a rectifying and smoothing circuit that is connected to the pair of input terminals and rectifies and smoothes an AC input voltage inputted via the input line and the pair of input terminals and outputs to the primary-side switch;

a fuse or breaker interposed on the input line; and a medical appliance that is connected downstream of the power supply and operates based on the output voltage from the power supply.

7. A medical system, comprising:

the power supply according to claim 1, which further includes a pair of input terminals connected to an input line, a rectifying and smoothing circuit that is connected via a pair of power supply lines to the pair of input terminals, rectifies and smoothes an AC input voltage inputted via the input line, the pair of input terminals, and the pair of power supply lines, and outputs to a primary-side switch, and a first fuse or first breaker interposed on one power supply line out of the pair of power supply lines;

a second fuse or second breaker interposed on the input line connected via the input terminal to another power supply line out of the pair of power supply lines; and a medical appliance that is connected downstream of the power supply and operates based on the output voltage from the power supply.

8. A medical system, comprising:

the power supply according to claim 2, which further includes a pair of input terminals connected to an input line, a rectifying and smoothing circuit that is connected via a pair of power supply lines to the pair of input terminals, rectifies and smoothes an AC input voltage inputted via the input line, the pair of input terminals, and the pair of power supply lines, and outputs to a primary-side switch, and a first fuse or first breaker interposed on one power supply line out of the pair of power supply lines;

a second fuse or second breaker interposed on the input line connected via the input terminal to another power supply line out of the pair of power supply lines; and a medical appliance that is connected downstream of the power supply and operates based on the output voltage from the power supply.

\* \* \* \* \*